(12) United States Patent
Macha et al.

(10) Patent No.: US 7,415,005 B1
(45) Date of Patent: Aug. 19, 2008

(54) AD HOC SELECTION OF VOICE OVER INTERNET STREAMS

(75) Inventors: Mitchell G. Macha, Alvin, TX (US); John T. Bullock, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1384 days.

(21) Appl. No.: 10/283,354

(22) Filed: Oct. 24, 2002

Related U.S. Application Data

(60) Provisional application No. 60/350,906, filed on Oct. 29, 2001.

(51) Int. Cl.
*H04L 12/66* (2006.01)
(52) U.S. Cl. ..................... 370/352; 370/355
(58) Field of Classification Search .......... 370/352–356
See application file for complete search history.

(56) References Cited

U.S. PATENT DOCUMENTS

| | | | |
|---|---|---|---|
| 5,883,891 A | 3/1999 | Williams et al. | |
| 5,974,142 A | 10/1999 | Heer et al. | |
| 5,983,282 A | 11/1999 | Yucebay | |
| 6,016,350 A | 1/2000 | Funabe et al. | |
| 6,061,347 A | 5/2000 | Hollatz et al. | |
| 6,122,364 A | 9/2000 | Petrunka et al. | |
| 6,141,341 A | 10/2000 | Jones et al. | |
| 6,175,628 B1 | 1/2001 | Reinold et al. | |
| 6,181,694 B1 | 1/2001 | Pickett | |
| 6,233,235 B1 | 5/2001 | Burke et al. | |
| 6,253,249 B1 | 6/2001 | Belzile | |
| 6,259,677 B1 | 7/2001 | Jain | |
| 6,259,691 B1 | 7/2001 | Naudus | |
| 6,259,695 B1 | 7/2001 | Ofek | |
| 6,272,633 B1 | 8/2001 | Duke et al. | |
| 6,278,707 B1 | 8/2001 | MacMillan et al. | |
| 6,282,192 B1 | 8/2001 | Murphy et al. | |
| 6,292,480 B1 | 9/2001 | May | |
| 6,298,062 B1 | 10/2001 | Gardell et al. | |
| 6,389,005 B1 * | 5/2002 | Cruickshank | 370/352 |
| 7,139,263 B2 * | 11/2006 | Miller et al. | 370/352 |

* cited by examiner

*Primary Examiner*—Suhan Ni
(74) *Attorney, Agent, or Firm*—Theodore U. Ro

(57) ABSTRACT

A method and apparatus for a communication system technique involving ad hoc selection of at least two audio streams is provided. Each of the at least two audio streams is a packetized version of an audio source. A data connection exists between a server and a client where a transport protocol actively propagates the at least two audio streams from the server to the client. Furthermore, software instructions executable on the client indicate a presence of the at least two audio streams, allow selection of at least one of the at least two audio streams, and direct the selected at least one of the at least two audio streams for audio playback.

3 Claims, 7 Drawing Sheets

AD HOC SELECTION OF VOICE OVER INTERNET STREAMS

CROSS-REFERENCE TO RELATED APPLICATIONS

This application claims benefit of U.S. Provisional Application Ser. No. 60/350,906, filed Oct. 29, 2001, entitled "MCC voice over internet protocol (VOIP)," in the names of Mitchell Macha and John Bullock.

STATEMENT REGARDING FEDERALLY SPONSORED RESEARCH AND DEVELOPMENT

The invention described herein was made in the performance of work under a NASA contract and is subject to Public Law 96-517 (35 U.S.C. § 200 et seq.). The contractor has not elected to retain title to the invention.

BACKGROUND OF INVENTION

Transmission and reception of audio is a mainstay of human communication. For example, telephone, CB radio, FM/AM radio, and voice mail are typical implementations that provide auditory communication. While the telephone and the CB radio enable bi-directional communication, FM/AM radio and voice mail typically provide unidirectional communication. Unidirectional communication provides a means to convey instructions, information, alerts, and/or situational awareness from an audio source to a listener.

Situational awareness may provide an understanding of current or past events that may require present or future actions. For example, monitoring air traffic control, stock exchange broker conferences, mission control communications, or police, fire, and EMS dispatch voice communications provide an awareness. Typical situational awareness communications may convey routine activity or situations. However, by maintaining an awareness, unusual or critical situations may become apparent, and more information about the events that lead to the situation may be known by a listener much earlier.

Systems that provide situational awareness are typically dedicated networks. In other words, dedicated networks are constructed for the sole purpose of conveying a particular type of information. For example, police, fire, and EMS dispatch voice communications may have dedicated network(s) to route incoming information to an appropriate agency in a timely fashion. Air traffic control and stock exchange broker conferences may restrict the number of listeners due to concerns about security, privacy, subscription fees, and/or cost.

Adding listeners to a communication system may be desirable; however, the addition of listeners may involve extending the dedicated network(s). The ability to extend the dedicated network(s) may be limited due to a distance between an audio source and a listener, security/privacy concerns, and/or cost.

SUMMARY OF INVENTION

According to one aspect of the present invention, a communication system comprising a server arranged to actively propagate at least two audio streams where each of the at least two audio streams is a packetized version of an audio source; a client operatively connected to the server with a data connection where a transport protocol actively propagates the at least two audio streams from the server to the client; and software instructions executable on the client for indicating a presence of the at least two audio streams; selecting at least one of the at least two audio streams dependent on a listener; and directing the selected at least one of the at least two audio streams for audio playback.

According to one aspect of the present invention, a computer-readable medium having recorded thereon instructions executable by a processor, the instructions comprising instructions for indicating a presence of at least two audio streams actively propagated from a server; instructions for ad hoc selecting of at least one of the at least two audio streams dependent on a listener; and instructions for directing the selected at least one of the at least two audio streams for audio playback.

According to one aspect of the present invention, a computer system for communications comprising a processor; a memory; and software instructions stored in the memory adapted to cause the computer system to indicate a presence of at least two audio streams actively propagated to a client; select at least one of the at least two audio streams dependent on a listener; and direct the selected at least one of the at least two audio streams for audio playback.

According to one aspect of the present invention, a method for performing ad hoc selection of at least two audio streams comprising packetizing the at least two audio streams; actively propagating the at least two audio streams from a server to a client; indicating a presence of the at least two audio streams is performed by the client; selecting at least one of the at least two audio streams is performed by the client dependent on a listener; and directing the selected at least one of the at least two audio streams for audio playback.

According to one aspect of the present invention, a communication system comprising means for packetizing at least two audio streams; means for actively propagating the at least two audio streams from a server to a client; means for indicating a presence of the at least two audio streams at the client; means for selecting at least one of the at least two audio streams at the client; and means for directing the selected at least one of the at least two audio streams for audio playback.

Other aspects and advantages of the invention will be apparent from the following description and the appended claims.

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the present invention relate to an active propagation of at least two audio streams from a server to a client and selecting at least one of the at least two audio streams using the client to be directed for audio playback. For the purposes of this disclosure, actively propagating the at least two audio streams from the server to the client refers to the client continuously receiving the at least two audio streams. In one or more embodiments, a listener may ad hoc select the at least one of the at least two audio streams to be directed for audio playback. For the purposes of this disclosure, ad hoc selection refers to the listener having the ability to select any, all, or none of the at least two audio streams continuously received at the client to be directed for audio playback.

Figure 1:
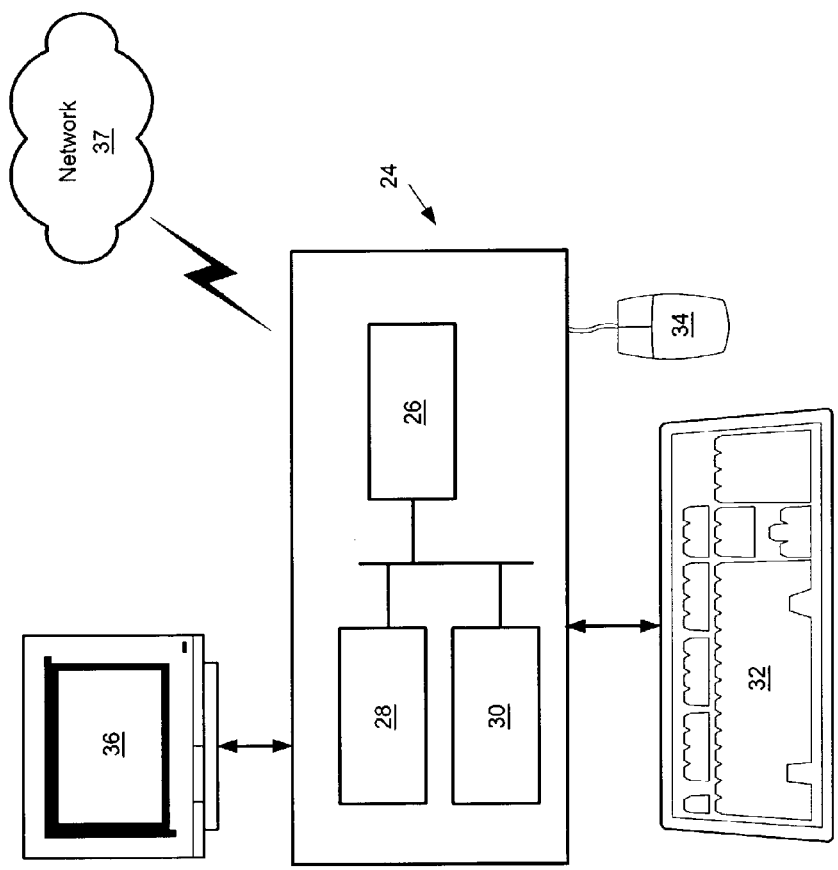
FIG. 1 illustrates a typical computer.

The invention may be implemented on virtually any type of computer regardless of the platform being used. For example, as shown in FIG. 1, a typical computer (24) includes a processor (26), memory (28), a storage device (30), and numerous other elements and functionalities typical of today's computers (not shown). The computer (24) may also include input means, such as a keyboard (32) and a mouse (34), and output means, such as a monitor (36). Those skilled in the art will appreciate that these input and output means may take other forms in an accessible environment. The computer (24) may be connected to a network (37) or other resources (not shown).

Figure 2:
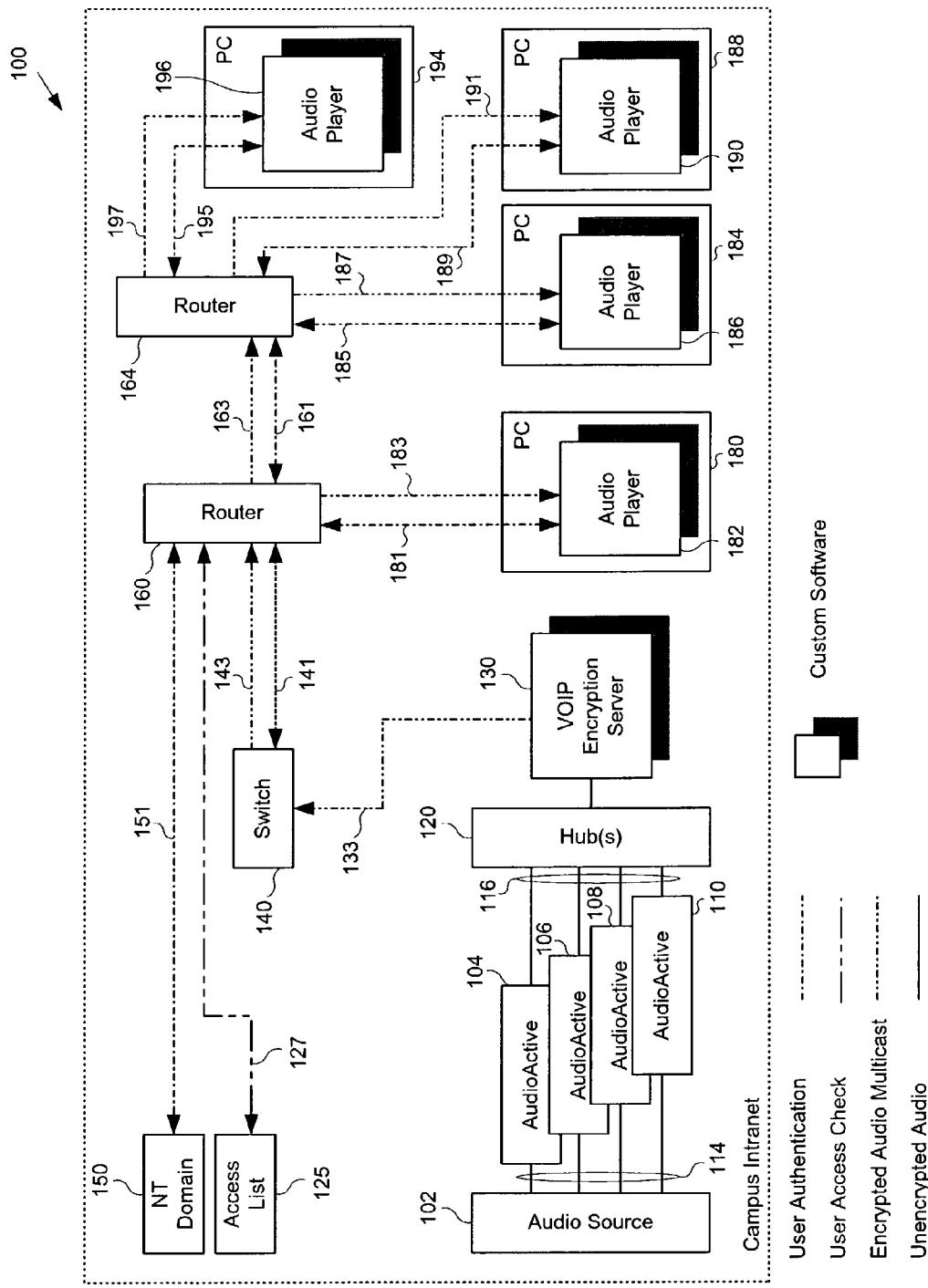
FIG. 2 shows a block diagram of a communication system in accordance with an embodiment of the present invention.

FIG. 2 shows a block diagram of an exemplary communication system (100) in accordance with an embodiment of the present invention. A plurality of audio sources are available at an audio source (102). An audio source may include audio signals and/or voice signals. For purposes of this disclosure, voice signals include those sounds manufactured by a living being, whereas audio signals include voice signals and all other signals that may be perceived by a listener.

The audio source (102) provides a plurality of analog signals on lines (114). One or more audioactive elements (104, 106, 108, 110) convert the plurality of analog signals on lines (114) to a plurality of digital signals on lines (116). The audioactive elements (104, 106, 108, 110) also packetize the plurality of digital signals on lines (116). Packetization allows a digital signal to be separated into groups of bits, often referred to as packets. Accordingly, packets may be interspersed with other packets and propagated on a network or data connection using a transport protocol. A transport protocol, for example, may include TCP/IP. Propagation on a network, e.g., an Ethernet based network, may use an address and a sequence number. The address determines a final destination for the packets and information about forwarding the packets from one computer or router to another computer or another router. The sequence number determines the proper order for the packets in case the packets are received out of order. Accordingly, a plurality of packets carrying digital signals from one of the audio sources is referred to as an audio stream. One of ordinary skill in the art will understand that multiple audio streams may be generated from a single audio source. Furthermore, multiple audio streams may be generated from multiple audio sources.

The audioactive elements (104, 106, 108, 110) may also encode the digital signals on lines (116). For example, the digital signals may be encoded in a MP3 (MPEG Audio Layer 3) format, ITU G.723.1 voice coder format, or other format. Encoding may enable compression of the digital signals on lines (116).

The packetized, and possibly, encoded digital signals on lines (116) use one or more hubs (120) to propagate the packets to a voice over internet protocol (VOIP) encryption server (130). The propagation may use, for example, a universal datagram protocol (UDP) service. The VOIP encryption server (130) encrypts the packets such that unauthorized reception of encrypted packets does not allow the encrypted packets to be converted to a useful form. The encrypted packets are propagated to a switch (140) using line(s) (133). One of ordinary skill in the art will understand that the encryption server (130) is representative of a device that encrypts the packets (i.e., an encrypter).

The encrypted packets may propagate from the VOIP encryption server (130), for example, as multicast packets (packets transmitted using the multicast transport protocol). The encrypted packets may be sent to a unique multicast address/port combination. The unique multicast address/port combination provides the ability for audio players (182, 186, 190, 196) operating on clients (180, 184, 188, 194) to receive and process each audio stream independently at a listener's discretion, respectively.

A campus intranet using multicast will see a total network load of the sum total of all of the audio streams regardless of the number of the listeners and the number of audio streams being monitored concurrently by the listeners. The VOIP encryption server (130) sends the encrypted packets as multicast to the campus intranet. Routers (160, 164) in the campus intranet distribute the encrypted packets as the multicast throughout the campus intranet with no further action being required of the VOIP encryption server (130). For example, encrypted packets may be uni-directionally propagated on lines (133, 143, 183, 163, 187, 191, 197).

The audio players (182, 186, 190, 196) perform a variety of tasks that may include user authentication through a server such as an NT domain server (150), access verification using an access list (125), multicast join for each of the audio streams, decrypting the encrypted packets, directing the selected audio streams for audio playback, and modifying the audio playback. When an audio player (182, 186, 190, 196) starts, the listener is prompted for an ID and password. The audio player (182, 186, 190, 196) validates the listener against a specific NT domain server (150) database to assure authentication using lines (151, 161, 181, 185, 189, 195).

Additionally, the audio player (182, 186, 190, 196) verifies that the listener has access authorization to the audio streams using an access list (125) and lines (127, 161, 181, 185, 189, 195). User authentication may be afforded to a large number of listeners. Access list (125) authorization may be afforded to a reduced number of listeners, and may cause the audio player (182, 186, 190, 196) to indicate a presence of a limited number of the available audio streams. Once both of these checks are completed, a control window for the audio player (182, 186, 190, 196) is presented to the listener. One of ordinary skill in the art will understand that a plurality of lines connecting two or more elements may be physically routed on a plurality of lines or virtually routed on a single line.

The audio player (182, 186, 190, 196) decrypts the encrypted packets received from the VOIP encryption server (130). The decrypting results in reproducing a copy of packets from an audio stream. The audio player (182, 186, 190, 196) directs the selected audio streams for audio playback. In one or more embodiments, the audio player (182, 186, 190, 196) may send the audio packets to a multimedia subsystem of the client (180, 184, 188, 194) using an application program interface. In one or more embodiments, the audio player (182, 186, 190, 196) may send the audio packets to another device or software interface operatively connected to the client (180, 184, 188, 194) for audio playback.

In one or more embodiments, the audio player (182, 186, 190, 196) may allow modification of the audio playback of an audio stream. Modifying may include changing a volume, muting, and stopping an audio playback. In one or more embodiments, the audio player (182, 186, 190, 196) may also allow modification by stopping the propagation of an audio stream to the client (180, 184, 188, 194), starting the propagation of an audio stream to the client (180, 184, 188, 194), and flushing a stream buffer of an audio streams.

One of ordinary skill in the art will understand that additional lines between elements of the campus intranet may exist. The additional lines may enable communication not specifically described. For example, communication between the switch (140) and the router (160) may use line (141).

Figure 3:
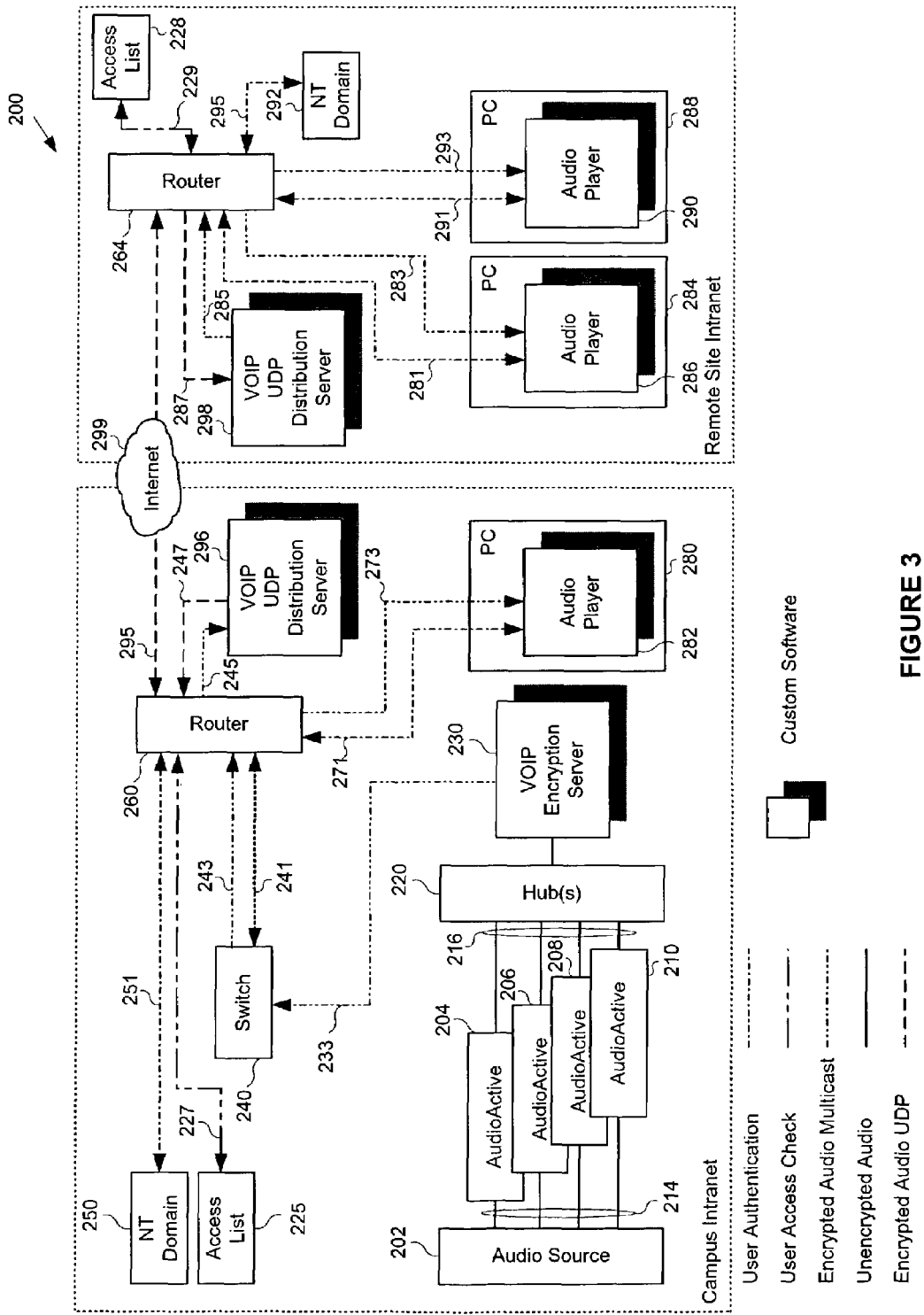
FIG. 3 shows a block diagram of a communication system in accordance with an embodiment of the present invention.

In FIG. 2, the communication system (100) resides on a campus intranet. FIG. 3 shows a block diagram of an exemplary communication system (200) in accordance with an embodiment of the present invention. The communication system (200) allows encrypted packets to travel beyond a campus intranet to a remote site intranet using, for example, an Internet (299).

A plurality of audio sources are available at an audio source (202). An audio source may include audio signals and/or voice signals. The audio source (202) provides a plurality of analog signals on lines (214). One or more audioactive elements (204, 206, 208, 210) convert the plurality of analog signals on lines (214) to a plurality of digital signals on lines (216). The audioactive elements (204, 206, 208, 210) also packetize the plurality of digital signals on lines (216).

The audioactive elements (204, 206, 208, 210) may also encode the digital signals on lines (216). For example, the digital signals may be encoded in a MP3 (MPEG Audio Layer 3) format, ITU G.723.1 voice coder format, or other format. Encoding may enable compression of the digital signals on lines (216).

The packetized and possibly encoded digital signals on lines (216) use one or more hubs (220) to propagate the packets to a voice over internet protocol (VOIP) encryption server (230). The propagation may use, for example, a universal datagram protocol service. The VOIP encryption server (230) encrypts the packets such that unauthorized reception of encrypted packets does not allow the encrypted packets to be converted to a useful form. The encrypted packets are propagated to a switch (240) using line(s) (233).

The encrypted packets may propagate from the VOIP encryption server (230), for example, as multicast packets. The encrypted packets may be sent to a unique multicast address/port combination. The unique multicast address/port combination provides the ability for audio players (282, 286, 290) operating on clients (280, 284, 288) to receive and process each audio stream independently at a listener's discretion, respectively. The VOIP encryption server (230) sends the encrypted packets as multicast to the campus intranet. Router (260) in the campus intranet distributes the encrypted packets as the multicast throughout the campus intranet with no further action being required of the VOIP encryption server (230). For example, encrypted packets may be uni-directionally propagated on lines (233, 243, 273).

A single campus intranet may be extended to a remote site intranet using, for example, an Internet (299). Encrypted packets may be propagated from the VOIP encryption server (230) to a VOIP UDP distribution server (296) using one or more switches and routers such as switch (240) and router (260). Encrypted packets may be uni-directionally propagated on lines (233, 243, 245). The VOIP UDP distribution server (296) allows the encrypted packets, even if using a multicast protocol, to be propagated through the Internet (299) to the remote site intranet as UDP packets using lines (247, 287, 295). Additional routers, e.g., router (264), may propagate the UDP packets. A VOIP UDP distribution server (298) at the remote site intranet may recover the encrypted packets from the UDP packets and uni-directionally propagate the encrypted packets on lines (283, 285, 293). By using the multicast protocol, each of the campus intranet and the remote site intranet will see a total network load of the sum total of all of the audio streams, regardless of the number of the listeners and the number of audio streams being monitored concurrently by the listeners.

The audio player (282) performs a variety of tasks that may include user authentication through a server such as an NT domain server (250), access verification using an access list (225), multicast join for each of the audio streams, decrypting the encrypted packets, directing the selected audio streams for audio playback, and modifying the audio playback. When the audio player (282) starts, the listener is prompted for an ID and password. The audio player (282) validates the listener against a specific NT domain server (250) database to assure authentication using lines (251, 271).

Additionally, the audio player (282) verifies that the listener has access authorization to the audio streams using an access list (225) and lines (227, 271). User authentication may be afforded to a large number of listeners. Access list (225) authorization may be afforded to a reduced number of listeners, and may cause the audio player (282) to indicate a presence of a limited number of the available audio streams. Once both of these checks are completed, a control window for the audio player (282) is presented to the listener.

Audio players (286, 290) perform a variety of tasks that may include user authentication through a server such as an NT domain server (292), access verification using an access list (228), multicast join for each of the audio streams, decrypting the encrypted packets, directing the selected audio streams for audio playback, and modifying the audio playback. When the audio players (286, 290) start, the listener is prompted for an ID and password. The audio player (286, 290) validates the listener against a specific NT domain server (292) database to assure authentication using lines (281, 291, 295).

Additionally, the audio players verify that the listener has access authorization to the audio streams using an access list (228) and lines (229, 281, 291). User authentication may be afforded to a large number of listeners. Access list (228) authorization may be afforded to a reduced number of listeners, and may cause the audio players (286, 290) to indicate a presence of a limited number of the available audio streams. Once both of these checks are completed, a control window for the audio players (286, 290) is presented to the listener.

One of ordinary skill in the art will understand that a plurality of lines connecting two or more elements may be physically routed on a plurality of lines or virtually routed on a single line.

The audio player (282, 286, 290) decrypts the encrypted packets received from the VOIP encryption server (230). The decrypting results in reproducing a copy of packets from an audio stream. The audio player (282, 286, 290) directs the selected audio streams for audio playback. The audio player (282, 286, 290) may send the audio packets to a multimedia subsystem of the client (280, 284, 288) using an application program interface. The audio player (282, 286, 290) may send the audio packets to another device or software interface operatively connected to the client (280, 284, 288) for audio playback.

One of ordinary skill in the art will understand that additional lines between elements of the campus intranet may exist. The additional lines may enable communication not specifically described. For example, communication between the switch (240) and the router (260) may use line (241).

Figure 4:
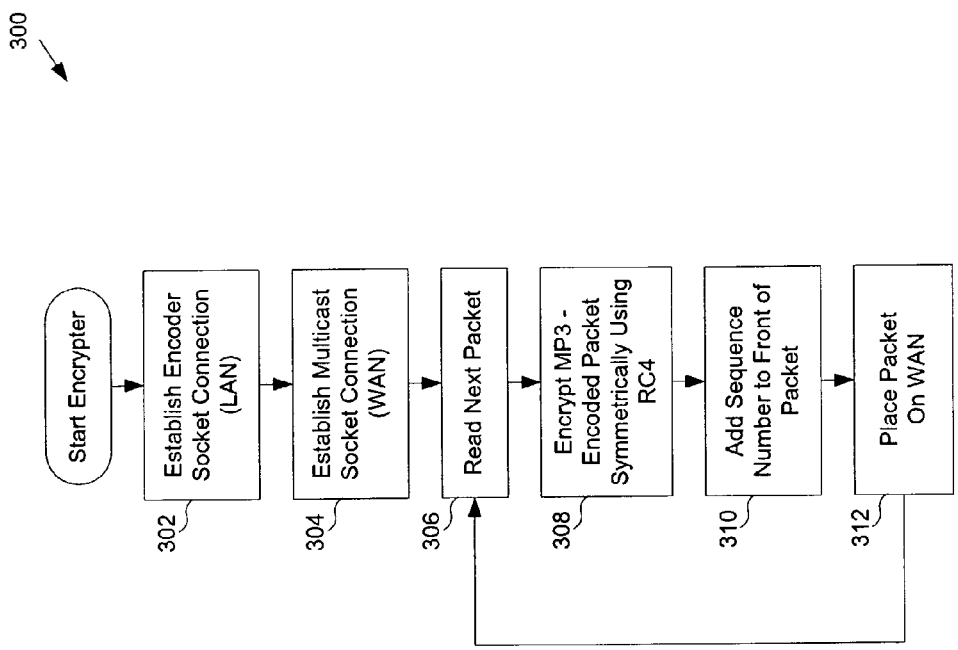
FIG. 4 shows a flow diagram of software instructions executable on an encrypter in accordance with an embodiment of the present invention.

FIG. 4 shows an exemplary flow diagram (300) of software instructions executable on an encrypter in accordance with an embodiment of the present invention. The flow diagram (300) describes a process in which the encrypter encrypts an audio stream. In FIG. 2 for example, the VOIP encryption server (130) encrypts the packets from the audio streams propagated from the audioactive elements (104, 106, 108, 110).

When an encrypter starts, a socket connection is established to one or more encoders that provides an audio stream (step 302). The socket connection may occur using a local area network (LAN). The encrypter also establishes a multicast connection to propagate data to one or more clients (step 304). The multicast socket connection may occur using a wide area network (WAN).

Once the socket connects are established (steps 302 and 304), a packet from the encoders is read (step 306). The packet is assumed to be encoded in a MP3 format. The packet is encrypted (step 308). The encryption is assumed to be symmetrical RC4. One of ordinary skill in the art will understand that alternative encoding formats and encrypting algorithms may be used. The encrypted packet has a sequence number appended to protect against duplicate packet reception (step 310). The encrypted packet with an appended sequence number is propagated on the WAN (step 312) and another packet from the encoders is read (step 306). Steps 306 through 312 are then appropriately repeated.

Figure 5:
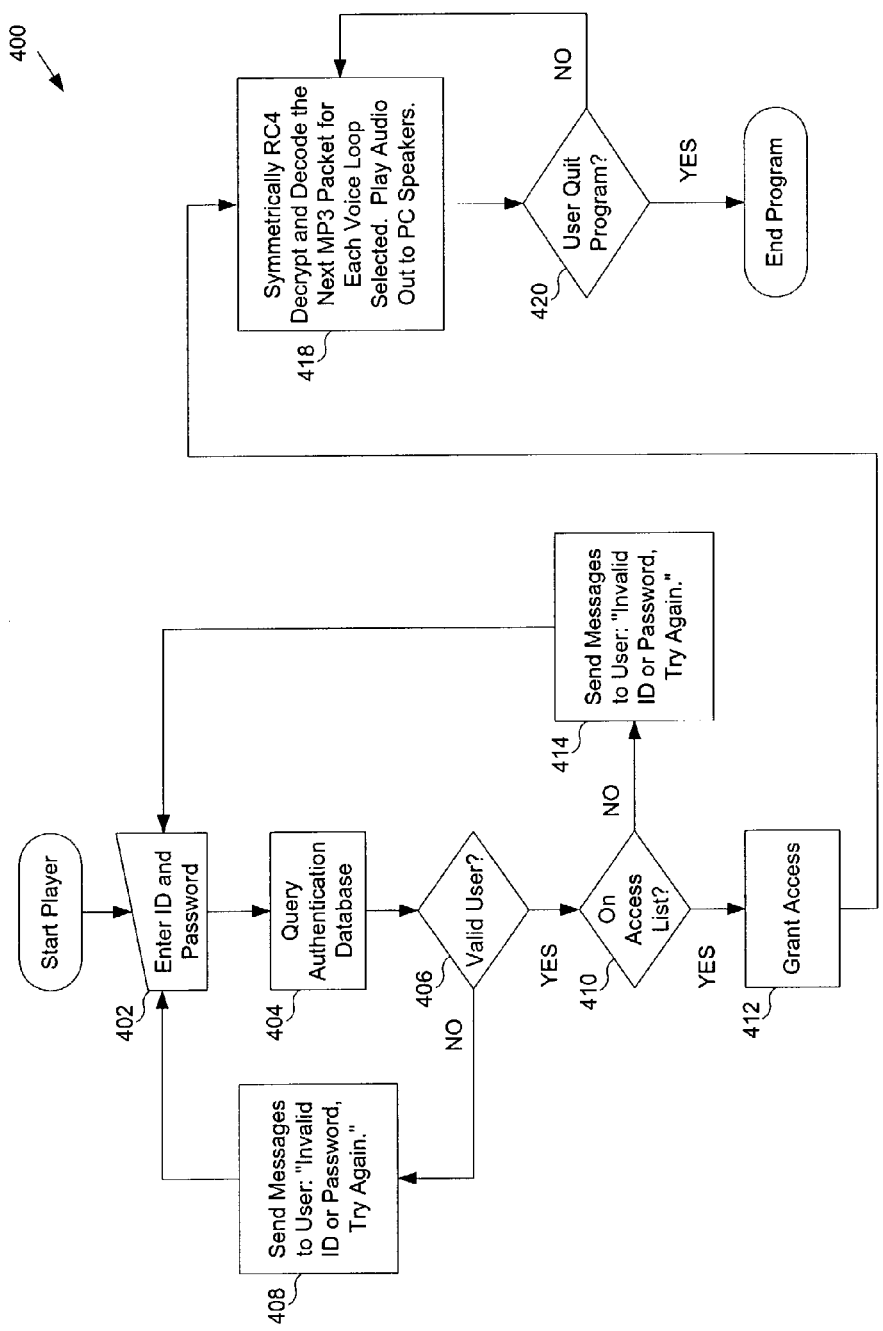
FIG. 5 shows a flow diagram of software instructions executable on a client in accordance with an embodiment of the present invention.

FIG. 5 shows an exemplary flow diagram (400) of software instructions executable on a client in accordance with an embodiment of the present invention. The flow diagram (400) shows a process in which a client establishes access to an encrypted audio stream and decrypts the encrypted packets for audio playback. When software instructions start for an audio player, for example audio players (182, 186, 190, 194) in FIG. 2, the software instructions request a listener to enter an ID and password (step 402). The ID and password are propagated to an authentication database (step 404). A comparison of the ID and password entered in step 402 are compared to entries in the authentication database (step 406). If the comparison is successful, step 410 is followed. If the comparison is unsuccessful, step 408 is followed. In step 414, an error message is generated and steps 402, 404, and 406 are repeated.

Once authentication has been achieved (step 406), access is determined (step 410). If a listener is on the access list, access to the audio streams is granted (step 412). Otherwise, access is not granted and the listener is sent back to step 402 via step 414.

In FIG. 5, an encrypted packet from the selected audio streams are decrypted and decoded (step 418). The decryption is assumed to be symmetrical RC4. The packet is assumed to be encoded in a MP3 format. One or ordinary skill in the art will understand that alternative encoding formats and encrypting algorithms may be used that will result in alternative decoding and decrypting algorithms. The decrypted, decoded packet is directed for audio playback. Step 418 is repeated until the listener quits the software instructions (step 420).

Figure 6:
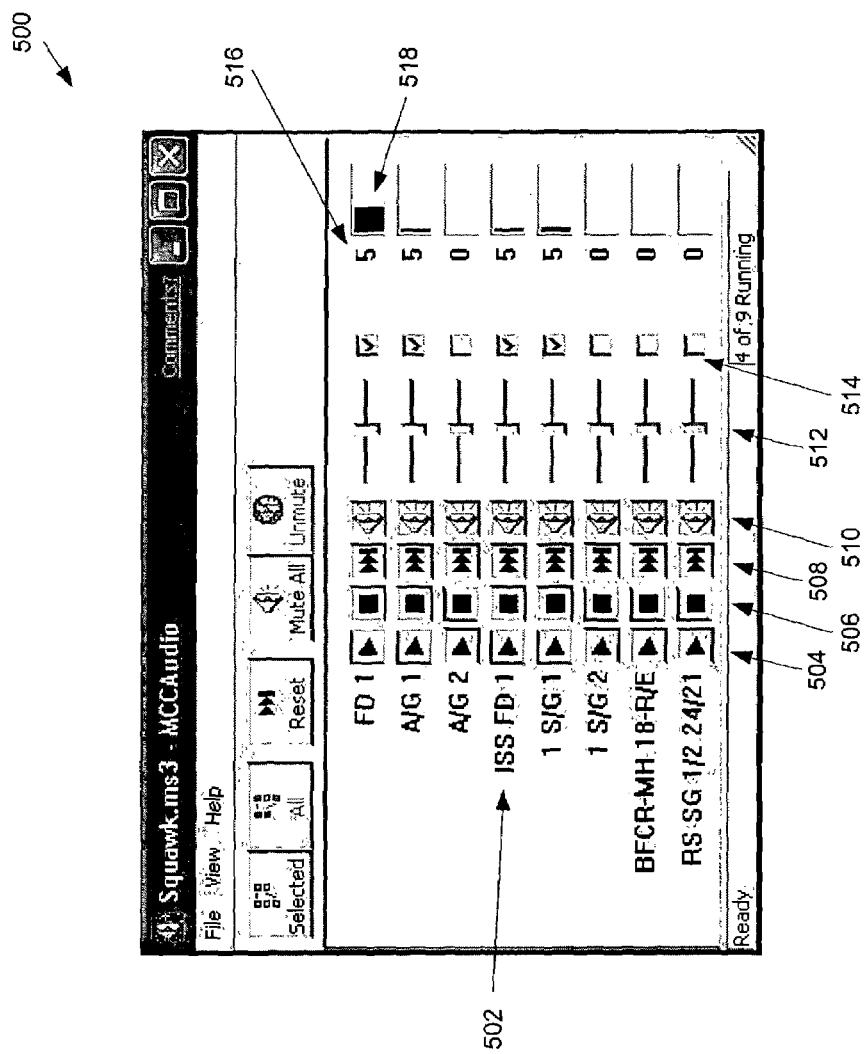
FIG. 6 shows an exemplary client controls window in accordance with an embodiment of the present invention.

FIG. 6 shows an exemplary client controls window (500) in accordance with an embodiment of the present invention. Referring to FIG. 6, the client controls window (500) exists as a Graphical User Interface (GUI), for example, a floating window with buttons to select audio streams, buttons to modify the audio playback, and indicators to provide information about the selected audio streams and modifications to the audio playback. A GUI is part of a software application that interacts with a listener via a graphical display. The GUI receives input from the listener through different modes of access, such as a mouse and pointer combination, or through a keyboard. A visual output of a GUI is typically displayed on a display device, such as a computer monitor screen, and includes widgets that allow the user to interact with the GUI. Examples of widgets include windows, captions, buttons, labels, menu bars, toolbars, dialog boxes, menus, icons, etc. Widgets may also represent software applications that may be executed by the listener or a pointer icon that represents the position of the mouse.

An exemplary GUI visual output of a client controls window (500) is shown in FIG. 6. As shown, a client controls window (500) displays a text list indicating a presence of accessible audio streams in the left column. For example, International Space Station Flight Data 1 (ISS FD 1) (502) is one of nine accessible audio streams listed. Eight of the available nine audio streams are shown. Enlarging the client controls window allows the last audio stream to be displayed. Four of the nine audio streams are selected using the play buttons (504). The four selected audio streams are actively propagated on a data connection between a server and a client using a transport protocol. The remaining five audio streams are stopped, as indicated by the depressed stop buttons (506). The remaining five audio streams are not actively propagated to the client, however, all nine audio streams are actively propagated on a network by the server. Audio streams that are stopped may be started using play buttons (504).

Audio streams that are playing may be stopped using stop buttons (506). Stopping a playback of an audio stream also stops that active propagation of the audio stream to the client.

In FIG. 6, the four selected audio streams are directed for audio playback. The audio playback of the four selected audio streams may be modified. The audio playback of an audio stream may be muted using buttons (510). The volume of the four selected audio streams may be changed using slider buttons (512). The audio stream buffer may be flushed using buttons (508).

In FIG. 6, indicators may provide information about the selected audio streams and modifications to the audio playback of the selected audio streams. Check boxes (514) indicate that a selected audio stream has active packets being received by the client. A numerical indicator (516) indicates a number of packets currently in the audio stream buffer. A VU meter (518) provides an indicator of a playback audio volume magnitude.

To begin listening to audio streams, a listener selects a play button (504) of one or more audio streams to monitor. The client controls window (500) spawns a read process for the selected audio streams and the spawned process performs a multicast join request for the selected audio streams. A router, for example router 164 in FIG. 2 and router 264 in FIG. 3) will process the multicast join request and will begin sending the encrypted multicast packets to the spawned process created by the client controls window (500). The spawned process created by the client controls window (500) will receive, decrypt, decode, and direct for playback the encrypted multicast packets. As a volume or muting feature is changed by a listener, interrupts are send to the spawned process to change those attributes of the audio stream directed for playback.

Figure 7:
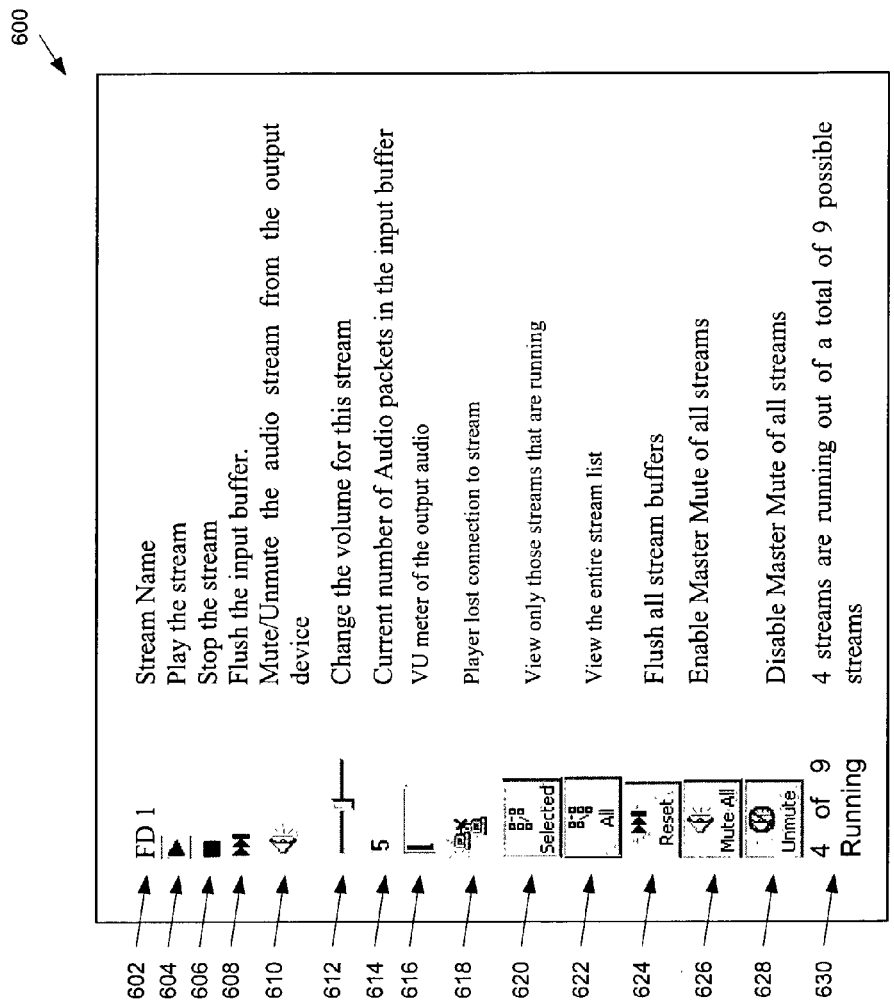
FIG. 7 shows a glossary for icons for an exemplary client controls window in accordance with an embodiment of the present invention.

FIG. 7 shows a glossary (600) for icons for an exemplary client controls window in accordance with an embodiment of the present invention. A text (602) listing indicates a presence of accessible audio streams. A play button (604) starts an active propagation of an encrypted audio stream to a client, the client decrypts and decodes the audio stream, and directs the audio stream for audio playback. The stop button (606) stops an active propagation of an encrypted audio stream to the client, and stops the audio playback of the audio stream. A button (608) flushes an audio stream buffer. A button (610) toggles between muting and unmuting an audio playback. A muted audio playback moves a volume of the audio playback to zero; however, the audio stream is still actively propagated, decrypted, decoded, and directed for audio playback.

In FIG. 7, a slider button (612) adjusts the volume of an audio playback. A numerical indicator (614) indicates a number of packets currently in an audio stream buffer. A VU meter (616) provides an indicator of a playback audio volume magnitude. An indicator (618) indicates that a client controls window has lost a connection to an audio stream(s). A button (620) causes a client controls window to display only the audio streams that are running. A button (622) causes a client controls window to display all of the audio streams that are accessible to a listener dependent on privilege. A button (624) flushes all audio stream buffers. A button (626) mutes an audio playback of all audio streams. A button (628) disables the mutes of an audio playback of all audio streams. A text indicator (630) displays the number of selected audio streams and the number of accessible audio streams.

Advantages of the present invention may include one or more of the following. In one or more embodiments, because a packetized version of an audio source is propagated on a data connection between a server and a client, a dedicated connection does not have to be created between the audio source and a listener.

In one or more embodiments, because a communication system includes audio streams, a data connection between a server and a client, an encrypter for encryption of the audio streams, and an audio player on the client that allows ad hoc selection of the audio streams, the communication system has a lower cost than a dedicated network and authentication and access may be controlled. Furthermore, situational awareness may be extended to a larger number of listeners, often in the listener's usual business setting. A special listening area is not required.

In one or more embodiments, a transport protocol includes a multicast protocol. A network load caused by propagating a plurality of audio streams will be a load of the plurality of the audio streams being propagated, regardless of the number of the listeners and the number of audio streams being monitored concurrently by the listeners. In other words, a network loading is dependent on the number of concurrent audio streams being actively propagated and not the number of listeners or the number of audio streams each listener has selected or hears.

In one or more embodiments, a transport protocol includes a UDP protocol such that encrypted audio streams from a campus intranet may be extended to a remote site intranet.

In one or more embodiments, because a plurality of audio streams is propagated to a client, multiple audio streams may be monitored simultaneously. Furthermore, ad hoc selection of actively propagated audio streams provides a listener the ability to monitor near real-time multiple concurrent audio streams.

In one or more embodiments, an audio player allows a listener a capability to individually control audio volume and muting for each audio streams on a real-time basis. Additional modifications to each audio stream and indicators for each audio stream may advantageously be provided by the audio player to the listener.

In one or more embodiments, a communication system is described that may provide monitor capability to supervisors of air traffic controller communication with Airline Pilots and traffic controller training, stock exchange broker conference monitoring, and/or police, fire, or EMS dispatch monitoring. In addition, it would be possible to set up a web site for the general public to listen to select loops from their home computers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A communication system, comprising:
a server arranged to actively propagate at least two audio streams, wherein each of the at least two audio streams is a packetized version of an audio source, wherein each of the at least two audio streams are encoded;
a client operatively connected to the server with a data connection, wherein a transport protocol actively propagates the at least two audio streams from the server to the client; and
software instructions executable on the client for
indicating a presence of the at least two audio streams;
selecting at least one of the at least two audio streams dependent on a listener;
directing the selected at least one of the at least two audio streams for audio playback; and
decoding the selected at least one of the at least two audio streams directed for audio playback.

2. A communication system, comprising:
a server arranged to actively propagate at least two audio streams, wherein each of the at least two audio streams is a packetized version of an audio source, wherein the at least two audio streams are encrypted;
software instructions executable on the server for encrypting the at least two audio streams;
a client operatively connected to the server with a data connection, wherein a transport protocol actively propagates the at least two audio streams from the server to the client; and
software instructions executable on the client for
indicating a presence of the at least two audio streams;
selecting at least one of the at least two audio streams dependent on a listener;
directing the selected at least one of the at least two audio streams for audio playback; and
decrypting the selected at least one of the at least two audio streams directed for audio playback.

3. A communication system, comprising:
a server arranged to actively propagate at least two audio streams, wherein each of the at least two audio streams is a packetized version of an audio source;
a client operatively connected to the server with a data connection, wherein a transport protocol actively propagates the at least two audio streams from the server to the client; and
software instructions executable on the client for
indicating a presence of the at least two audio streams;
selecting at least one of the at least two audio streams dependent on a listener;
directing the selected at least one of the at least two audio streams for audio playback; and
modifying the audio playback, wherein modifying includes at least one selected from the group consisting of changing a volume of the selected at least one of the at least two audio streams, muting the selected at least one of the at least two audio streams, flushing an audio stream buffer of at least one of the at least two audio streams, stopping the audio playback of the selected at least one of the at least two audio streams, stopping the actively propagating of the selected at least one of the at least two audio streams, and starting the actively propagating of the selected at least one of the at least two audio streams.

* * * * *